United States Patent
Urban et al.

(10) Patent No.: US 9,034,938 B2
(45) Date of Patent: May 19, 2015

(54) PHOTOREACTIVE POLYMER

(71) Applicant: BASF SE, Ludwigshafen (DE)

(72) Inventors: Dieter Urban, Speyer (DE); Ulrike Licht, Mannheim (DE); Theo Smit, Heidelberg (DE); Christopher Barner-Kowollik, Stutensee-Blankenloch (DE); Guillaume Delaittre, Mannheim (DE); Elena Frick, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/021,483

(22) Filed: Sep. 9, 2013

(65) Prior Publication Data
US 2014/0073717 A1 Mar. 13, 2014

Related U.S. Application Data

(60) Provisional application No. 61/699,898, filed on Sep. 12, 2012.

(51) Int. Cl.
| | |
|---|---|
| C08J 3/28 | (2006.01) |
| C08F 2/46 | (2006.01) |
| C08G 61/04 | (2006.01) |
| C08L 33/06 | (2006.01) |
| C08F 22/20 | (2006.01) |
| C08F 8/30 | (2006.01) |
| C08F 220/30 | (2006.01) |
| B82Y 30/00 | (2011.01) |
| C08F 120/30 | (2006.01) |
| C08F 8/48 | (2006.01) |
| C09D 151/00 | (2006.01) |
| C08F 220/18 | (2006.01) |
| C08F 222/38 | (2006.01) |

(52) U.S. Cl.
CPC ............ *C08L 33/064* (2013.01); *C08F 22/20* (2013.01); *C08L 33/06* (2013.01); *C08F 8/30* (2013.01); *C08F 220/18* (2013.01); *C08F 220/30* (2013.01); *C08F 222/385* (2013.01); *B82Y 30/00* (2013.01); *C08F 120/30* (2013.01); *C08F 8/48* (2013.01); *C09D 151/003* (2013.01); *C08F 2438/01* (2013.01); *C08F 2800/20* (2013.01); *C08F 2810/20* (2013.01); *C08F 2810/50* (2013.01)

(58) Field of Classification Search
CPC ............ C08L 33/06; C08F 8/30; C08F 22/20
USPC ................... 522/121, 120, 114, 113, 1; 520/1
See application file for complete search history.

(56) References Cited

U.S. PATENT DOCUMENTS

| | | | |
|---|---|---|---|
| 5,558,911 A * | 9/1996 | Blum | 427/517 |
| 2006/0142408 A1* | 6/2006 | Liu et al. | 522/6 |
| 2012/0010317 A1* | 1/2012 | Schmitt et al. | 522/35 |

FOREIGN PATENT DOCUMENTS

| | | | |
|---|---|---|---|
| EP | 0 081 083 A2 | | 6/1983 |
| EP | 0 678 562 A1 | | 10/1995 |
| EP | 1 676 870 A1 | | 7/2006 |
| WO | 2010/108752 | * | 9/2010 |
| WO | WO 2010/108752 A1 | | 9/2010 |

OTHER PUBLICATIONS

Winkler et al, Highly orthogonal functionalization of ADMET polymers via photoinduced Diels-Alder reactions, Jun. 7, 2012, Macromolecules, 45, 5012-5019.*

European Search Report issued Dec. 2, 2013 in Patent Application No. 13 18 2568 (with English Translation of Category of Cited Documents).

\* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

A description is given of a photoreactive polymer preparable by radical polymerization using at least one photoreactive monomer, where the photoreactive monomer has at least one radically polymerizable C—C double bond, at least one hydrophilic group selected from an ethylene glycol group and polyethylene glycol groups having at least 2 ethylene glycol units, and at least one photoreactive group, the photoreactive group being a photoenolizable carbonyl group.

20 Claims, No Drawings

PHOTOREACTIVE POLYMER

The invention relates to a photoreactive polymer preparable by radical polymerization using at least one photoreactive monomer, where the photoreactive monomer has at least one radically polymerizable C—C double bond, at least one particular hydrophilic group, and at least one particular photoreactive group. The invention also relates to aqueous compositions which comprise this polymer, and also to combinations of this polymer with compounds having electron-deficient double bonds, for photochemical crosslinking of the polymer.

The formation of polymer films from aqueous polymer dispersions, such as from polyacrylate dispersions, for example, is known. Films of this kind, in order to attain the necessary or desired performance properties, must often be crosslinked such that an interparticulate crosslinking reaction occurs between the polymer particles. For this purpose it is necessary to react reactive monomers in the emulsion polymerization in such a way that they are located on the particle surface. Frequently, moreover, crosslinking at room temperature is desired, especially in the case of crosslinking reactions which occur on temperature-sensitive substrates.

The formation of polymer films from aqueous solutions of water-soluble polymers is also known. Films of water-soluble polymers display a particularly high sensitivity to water, which can be diminished only by means of a high crosslinking density. Such crosslinking reactions generally require, alternatively, high temperatures, long reaction times, or the addition of highly toxic reagents, such as aziridines, for example.

It was an object of the present invention to provide hydrophilic—i.e., water-soluble or water-dispersible—polymers with which from aqueous systems it is possible to form films which are crosslinkable at low temperatures (e.g., room temperature), without addition of toxic compounds, to give films having improved water resistance.

The invention provides photoreactive polymers preparable by radical polymerization using at least one photoreactive monomer,
where the photoreactive monomer has
(i) at least one radically polymerizable C—C double bond,
(ii) at least one hydrophilic group selected from an ethylene glycol group and polyethylene glycol groups having at least 2 ethylene glycol units, and
(iii) at least one photoreactive group, the photoreactive group being a photoenolizable carbonyl group.

The invention also provides an aqueous composition comprising a photoreactive polymer of the invention in water, in dissolved or dispersed form.

The invention also provides crosslinked polymers preparable from photoreactive polymers of the invention by photoinduced crosslinking with a compound having at least two electron-deficient double bonds.

The invention also provides a process for preparing crosslinked polymers, where at least one photoreactive polymer of the invention and also at least one compound having at least two electron-deficient double bonds are provided and photochemical crosslinking is carried out.

The invention also provides for the use of photoreactive polymers of the invention for crosslinking films of aqueous emulsion polymers and films of water-soluble polymers for adhesives, coatings, paints and varnishes, inks, thickeners, tackifier resins, protective colloids, and dispersants.

In the text below, the designation (meth)acrylate and similar designations are used as abbreviated notation for "acrylate or methacrylate".

The term "photoreactive" relates to compounds which are able to enter into photoinduced chemical reactions—that is, compounds whose chemical reactivity is increased by the presence of light.

The photoreactive monomers have at least one, preferably one single, radically polymerizable C—C double bond. Examples of suitable monomers are those in which the radically polymerizable C—C double bond is part of an acrylate or methacrylate group.

The photoreactive monomers also have at least one hydrophilic group. The effect of the hydrophilic group is that, in polymer dispersions, the spatially adjacent photoreactive group is present together with the hydrophilic group on the surface of dispersed polymer particles, and the groups are therefore available for photoinduced reactions with compounds which are located in the aqueous phase or which have taken up residence on the surface of other polymer particles.

The hydrophilic group is a group having one or more ethylene glycol groups, as for example 2 to 30, preferably 3 to 30 or 3 to 20, more particularly 4 to 20 or 4 to 10, ethylene glycol groups. Where the remaining monomer has relatively high fractions of hydrophobic structural elements, it is preferred to use more ethylene glycol groups, as for example at least 5 to 20 or more. Where the remaining monomer has only low fractions of hydrophobic structural elements, it is preferred to use fewer ethylene glycol groups, as for example 1 to 20 or 2 to 10.

The photoreactive monomers also have at least one photoreactive group, the photoreactive group preferably being a photoenolizable carbonyl group. A photoenolizable carbonyl group is a keto group or aldehyde group which in the presence of light can be converted into the respective enol tautomer. Compounds of this kind are also referred to in abbreviated form below as "photoenols".

Preferred photoenolizable carbonyl groups are photoenolizable alpha-aryl-carbonyl groups. Suitable compounds are for example those in which the photoreactive group derives from a structural unit of the formula

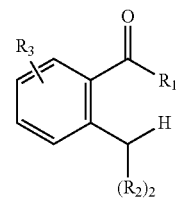

where $R_1$ is hydrogen or an organic radical, such as an alkyl or aryl group, $R_2$ is hydrogen or an organic radical, such as an alkyl group, preferably methyl, and $R_3$ stands for the substituents of the aromatic ring which are identical to or different from one another and may be joined to one another via one or more ring structures, examples being hydrogen, alkyl groups or aryl groups.

Preferred photoreactive monomers are compounds having the structure

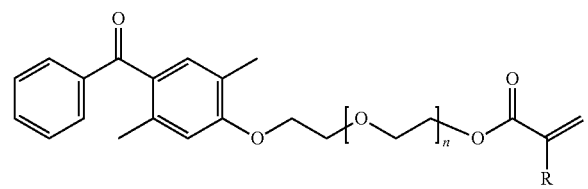

where n is a number from 0 to 29, preferably from 4 to 19, and R is hydrogen or methyl.

Compounds with this structure are preferably reacted with p-toluenesulfonyl chloride, starting from an ethylene glycol having the corresponding number of ethylene glycol groups n=0 to 29. This is followed by reaction with a compound which comprises a photoreactive group, this photoreactive group, as described above, being a photoenolizable carbonyl group. In the subsequent reaction, the radically polymerizable C—C double bond is introduced by reaction with a (meth)acryloyl halide, preferably a (meth)acryloyl chloride. Alternatively, the last stage may also be the acidic esterification with (meth)acrylic acid in accordance with the known methods, with acidic ion exchangers, for example, being suitable catalysts. Also suitable, alternatively, are enzymatic catalysts, such as, for example, a lipase from *Candida antarctica* B, which are available commercially under the name Novozym 435.

Preferred photoreactive monomers are also compounds having the structure

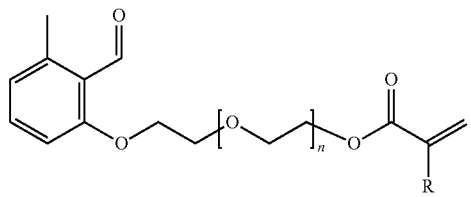

where n is a number from 0 to 19, preferably 1 to 9, and R is hydrogen or methyl.

Compounds of this structure are preferably prepared starting from a poly(ethylene glycol)(meth)acrylate—in other words, this starting compound already comprises the hydrophilic group and also the radically polymerizable C—C double bond. This reactant is subsequently reacted first with p-toluenesulfonyl chloride, for introduction of the photoreactive group, and subsequently with a compound which comprises a photoreactive group, this photoreactive group, as described above, being a photoenolizable carbonyl group.

The polymer of the invention may be a homopolymer. Preferred, however, are copolymers, more particularly copolymers in which the photoreactive monomer is copolymerized with one or more further monomers which do not carry any photoreactive groups. In the copolymers the photoreactive monomer is used preferably at not less than 0.1 wt %, preferably at 0.2 to 40 wt %, based on the sum total of all the monomers.

Further monomers for the preparation of copolymers are selected, for example, from C1 to C20 alkyl(meth)acrylates, C1 to C20 hydroxyalkyl(meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, acid monomers, or mixtures of these monomers. Examples include (meth)acrylic acid alkyl esters with a C1-C10 alkyl radical, such as methyl(meth)acrylate, ethyl(meth)acrylate, propyl(meth)acrylate, n-butyl acrylate, n-hexyl acrylate, octyl acrylate, and 2-ethylhexyl acrylate, or else butadiene, and also mixtures of these monomers. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methyl-styrene, alpha-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine, or bromine, preferably vinyl chloride and vinylidene chloride. Examples of vinyl ethers include vinyl methyl ether and vinyl isobutyl ether. Preferred vinyl ethers are those of alcohols comprising 1 to 4 C atoms. Hydrocarbons having 2 to 8 C atoms and one or two olefinic double bonds include ethylene, propylene, isoprene, and chloroprene. Particularly preferred further monomers are methyl acrylate, methyl methacrylate, ethyl acrylate, styrene, C1-C10-hydroxyalkyl(meth)acrylates, and (meth)acrylamide, and also mixtures of these monomers. In one embodiment 0-5 wt %, preferably 0.05 to 5 wt %, of C1-C10 hydroxyalkyl(meth)acrylates are used.

The polymer P1 is formed preferably to an extent of at least 0.1 wt %, preferably in amounts of 0.1 to 5, more preferably 0.2 to 4, very preferably 0.5 to 3 wt %, based on the total amount of monomers, from acid monomers. Acid monomers are ethylenically unsaturated, radically polymerizable monomers which contain at least one acid group. Examples of acid monomers are ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples thereof are acrylic acid, methacrylic acid, itaconic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate, and sulfopropyl methacrylate. Preferred are acrylic acid and methacrylic acid and a mixture thereof; acrylic acid is particularly preferred.

The further monomers are used in total preferably in an amount of 60 to 99.9 wt %, and the photoreactive monomers are used preferably in an amount of 0.1 to 40 wt %.

The photoreactive monomers may be prepared, for example, by etherifying a compound which is substituted by a hydroxyl group and has a photoenolizable alpha-aryl-carbonyl group with polyethylene glycol on the hydroxyl group, and carrying out subsequent reaction by esterification to give the (meth)acrylic ester.

The polymerization may take place by emulsion polymerization or by solution polymerization. In the case of preparation of the polymers by emulsion polymerization, the products are then emulsion polymers, with the abovementioned ethylenically unsaturated, radically polymerizable monomers being polymerized by radically initiated emulsion polymerization in water. In order to assist the dispersing of the monomers in the aqueous medium, it is possible to use the emulsifiers and/or protective colloids that are customarily employed as dispersants.

A comprehensive description of suitable protective colloids is found in Houben-Weyl, Methoden der organischen Chemie, Volume XIV/1, Makromolekulare Stoffe [Macromolecular compounds], Georg-Thieme-Verlag, Stuttgart, 1961, pages 411 to 420. Emulsifiers contemplated include anionic, cationic, and nonionic surface-active compounds, whose number-average molecular weight is typically below 2000 g/mol or preferably below 1500 g/mol, whereas the number-average molecular weight of the protective colloids is above 2000 g/mol, as for example from 2000 to 100 000 g/mol, more particularly from 5000 to 50 000 g/mol. Preference is given to using anionic and nonionic emulsifiers as surface-active substances. Examples of suitable emulsifiers are ethoxylated $C_8$ to $C_{36}$ fatty alcohols having a degree of ethoxylation of 3 to 50, ethoxylated mono-, di-, and tri-$C_4$ to $C_{12}$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino or ammonium group and at least one C8-C22 alkyl group. If emulsifiers and/or protective colloids are used as auxiliaries for dispersing the monomers, the amounts thereof that are used are for example 0.1 to 5 wt %, based on the monomers. Tradenames of emulsifiers are, for example, Dowfax®2 A1, Emulan® NP 50, Dextrol® OC 50, Emulgator 825, Emulgator 825 S, Emulan® OG, Texapon® NSO, Nekanil® 904 S, Lumiten® 1-RA, Lumiten E 3065, Disponil FES 77, Lutensol AT 18, Steinapol VSL, and Emulphor NPS 25. The surface-active substance is used usually in amounts of 0.1 to 10 wt %, based on the monomers to be polymerized.

In the emulsion polymerization it is usual to use water-soluble initiators for the radical polymerization of the monomers. Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems are composed of at least one, usually inorganic, reducing agent and one inorganic or organic oxidizing agent. The oxidizing component comprises, for example, the initiators already stated above for the emulsion polymerization. The reducing components comprise, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states. Customary redox initiator systems are, for example, ascorbic acid/iron(II) sulphate/sodium peroxodisulfate, tert-butyl hydroperoxide/sodium disulfite, and tert-butyl hydroperoxide/Na-hydroxymethanesulfinic acid. The individual components, the reducing component for example, may also be mixtures, an example being a mixture of the sodium salt of hydroxymethanesulfinic acid with sodium disulfite. The stated compounds are used usually in the form of aqueous solutions, with the lower concentration being determined by the amount of water that is acceptable in the dispersion, and the upper concentration by the solubility of the respective compound in water. Generally speaking the concentration is 0.1 to 30 wt %, preferably 0.5 to 20 wt %, more preferably 1.0 to 10 wt %, based on the solution. The amount of the initiators is generally 0.1 to 10 wt %, preferably 0.5 to 5 wt %, based on the monomers to be polymerized. It is also possible for two or more different initiators to be used in the emulsion polymerization.

In the polymerization it is also possible to use polymerization regulators of the kind known as chain transfer agents (CTAs). CTAs bring about a chain termination reaction and in so doing reduce the molar weight of the polymer. These CTAs become bonded to the polymer, generally to the chain end. The amount of the CTAs can in particular be 0.05 to 4 parts by weight, more preferably 0.05 to 0.8 part by weight, and very preferably 0.1 to 0.6 part by weight, based on 100 parts by weight of the monomers to be polymerized. Particularly suitable CTAs are compounds with a mercapto group such as tert-butyl mercaptan, ethyl thioglycolate, mercapto ethynol, mercaptopropyltrimethoxysilane, or tert-dodecyl mercaptan. The CTAs are generally compounds of low molecular weight, with a molar weight of less than 2000, more particularly less than 1000 g/mol.

The emulsion polymerization takes place in general at 30 to 130, preferably 50 to 90° C. The polymerization medium may consist either of water alone or else of mixtures of water and water-miscible liquids such as methanol, ethanol or tetrahydrofuran. It is preferred to use just water.

The monomer feed may be made in the form of a batch operation, continuously or in stages. The feed method can be carried out in a staged or gradient regime. Preference is given to the feed process, in which a part of the polymerization batch is introduced as an initial charge and heated to polymerization temperature, and its polymerization is begun, and then the remainder of the polymerization batch is fed to the polymerization zone, typically by way of two or more spatially separate feed streams, of which one or more comprise the monomers in pure form or in emulsified form, this feed being made continuously, in stages or subject to a concentration gradient, and polymerization being maintained during the feed. In the polymerization it is also possible to include a polymer seed in the initial charge, for the purpose, for example, of more effective establishment of the particle size.

The manner in which the initiator is added to the polymerization vessel in the course of the radical aqueous emulsion polymerization is known to a person of ordinary skill in the art. It may alternatively be included in its entirety in the initial charge to the polymerization vessel, or else introduced continuously or in stages at the rate at which it is consumed in the course of the radical aqueous emulsion polymerization. In each specific case this will depend on the chemical nature of the initiator system and on the polymerization temperature. It is preferred to include part in the initial charge and to feed in the remainder at the rate at which it is consumed, to the polymerization zone. If a chain transfer agent is used, the CTA as well may be included in part in the initial charge or added wholly or in part during the polymerization or toward the end of the polymerization.

For a high reactor space/time yield, dispersions having a very high solids content are preferred. In order to be able to attain solids contents >60 wt %, a bimodal or polymodal particle size ought to be established, since otherwise the viscosity becomes too high and the dispersion can no longer be managed. Producing a new particle generation can be done, for example, by adding seed (EP 81 083), by adding excess amounts of emulsifier, or by adding miniemulsions. Another advantage associated with the combination of low viscosity and high solids content is the improved coating behavior at high solids contents. Producing one or more new particle generations can be done at any desired point in time. This point in time is dependent on the particle size distribution that is desired for a low viscosity.

The monomers are preferably added at least partly during the polymerization, continuously. In part it is also possible for monomers to be included in the initial charge to the polymerization vessel before polymerization is commenced. It is preferred for not more than 30 wt % of the total amount of the monomers, more preferably not more than 20 wt %, very preferably not more than 10 wt % of the monomers, to be included in the initial charge to the polymerization vessel. The remaining monomers, i.e., preferably at least 70 wt %, more preferably at least 80 wt %, very preferably at least 90 wt %, are added continuously during the polymerization. In one particular embodiment no monomers are included in the initial charge—that is, the entirety of the monomers is run in during the polymerization. In the case of the feed process, the individual components can be added to the reactor from the top, in the side or from below, through the reactor base.

For the purpose of removing the residual monomers it is also possible to add further initiator after the end of the emulsion polymerization proper, i.e., after the conversion of all of the monomers (chemical deodorization). In the case of emulsion polymerization, aqueous dispersions of the polymer are obtained generally with solids contents of 15 to 75 wt %, preferably of 40 to 75 wt %. The polymer thus prepared is used preferably in the form of its aqueous dispersion.

The size distribution of the dispersion particles may be monomodal, bimodal, or multimodal. In the case of monomodal particle size distribution, the average size of the polymer particles dispersed in the aqueous dispersion is preferably less than 400 nm, more particularly less than 200 nm. With particular preference the average particle size is between 140 and 200 nm. By average particle size here is meant the $d_{50}$ of the particle size distribution; i.e., 50 wt % of the total mass of all the particles have a smaller particle diameter than the $d_{50}$ figure. The particle size distribution can be determined in a known way with the analytical ultracentrifuge (W. Mächtle, Makromolekulare Chemie 185 (1984), pages 1025-1039). In the case of bimodal or multimodal particle size distribution, the particle size can be up to 1000 nm. The pH of the polymer dispersion is preferably set at more than 4.5, more particularly to a pH between 5 and 8.

The invention also provides aqueous compositions comprising at least one polymer of the invention in water, in dissolved or dispersed form. In one embodiment the composition further comprises at least one compound which in the presence of light (preferably after film formation or after coating of a substrate) is able to react with the photoreactive groups of the polymer, thus forming, for example, grafting products, branching products, or crosslinking products. With particular preference the composition comprises at least one compound having at least one or at least two, preferably precisely two, electron-deficient double bonds. From a photoenolizable alpha-aryl-carbonyl group it is possible by photoisomerization to prepare the enol form, which with a compound having electron-deficient double bonding is able to form an adduct in a Diels-Alder reaction. The principle of the reaction is as follows:

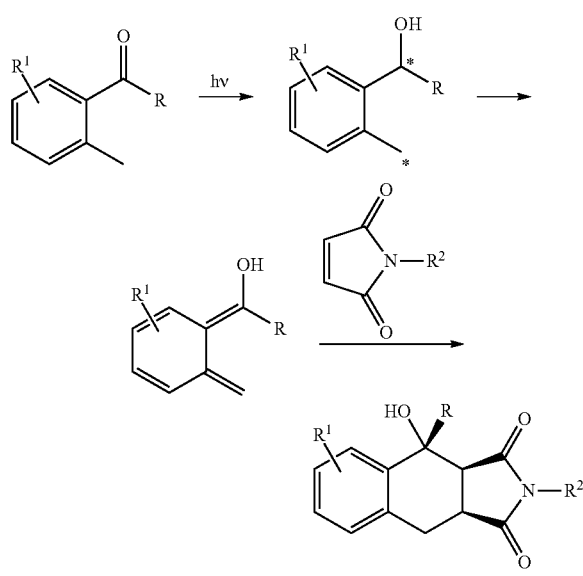

Electron-deficient double bonds are, for example, double bonds having at least one, preferably two, electron-withdrawing groups, examples being carboxylic acids, carboxamides, carboxylic esters, lactones, imides, nitriles, etc.

Examples of suitable compounds having electron-deficient double bonds are compounds having structural units derived from maleic acid, maleic anhydride, fumaric acid, maleimides, maleic monoesters or diesters, fumaric monoesters or diesters, acrylic esters, acrylamides, itaconic esters. The amount of compounds having electron-deficient double bonds is selected such that there is at most an equimolar ratio of photoenol groups to electron-deficient double bonds; preference is given to using the crosslinker more in deficit proportion.

The compound having electron-deficient double bonding is preferably soluble in water—that is, it is in dissolved form in the aqueous composition (at 20° C.). The water solubility may for example be 1 to 10 g/l at 20° C.

Preferred compounds with electron-deficient double bonds are bismaleimides, more particularly bismaleimides in which two terminal maleimide groups are linked via a spacer group, an example being a polyalkylene glycol group. The polyalkylene glycol group is preferably a polyethylene glycol group having at least one, 1 to 20 for example, preferably at least two, ethylene glycol units.

The aqueous composition of the invention may also comprise further additives. The additives are selected for example from fillers, dyes, leveling agents, thickeners, preferably associative thickeners, defoamers, plasticizers, pigments, wetting agents, UV stabilizers, and tackifiers. For better surface wetting it is possible for the compositions in particular to comprise wetting assistants, examples being fatty alcohol ethoxylates, alkylphenol ethoxylates, sulfosuccinic esters, nonylphenol ethoxylates, polyoxyethylenes/propylenes, or sodium dodecylsulfonates. The amount of further additives is generally 0.05 to 5 parts by weight, more particularly 0.1 to 3 parts by weight, per 100 parts by weight of polymer (solids).

The invention additionally provides crosslinked polymers, in the form for example of polymer films, layers or coatings, preparable from a photoreactive polymer of the invention by photoinduced crosslinking with a compound having at least two electron-deficient double bonds.

The invention also provides a process for preparing crosslinked polymers (in the form for example of polymer films, layers or coatings), where at least one photoreactive polymer of the invention and also at least one compound having at least two electron-deficient double bonds are provided and are photochemically crosslinked. The uncrosslinked polymer is provided preferably in the form of an aqueous polymer solution or in dispersed form, as a polymer dispersion. From the polymer solution or from the polymer dispersion, a film or a coating is produced, dried, and crosslinked. The photoreactive polymer is prepared preferably by emulsion polymerization.

The subjects of the invention can be used in the area of film-forming products (adhesives, coatings, paints, and varnishes). The inventions are able to increase the stability of the films as a result of the use of light; a high temperature is not required. The inventions possess possible applications in aqueous emulsion polymers for various applications for modifying the particle surfaces or the films formed therefrom. Products might include, for example, adhesives whose bond strength is boosted by exposure to light. Other products might include paints or varnishes which following exposure to light possess a higher abrasion resistance and are insoluble in water.

EXAMPLES

Example 1

Synthesis of Photoenol Monomer 1

Synthesis scheme:

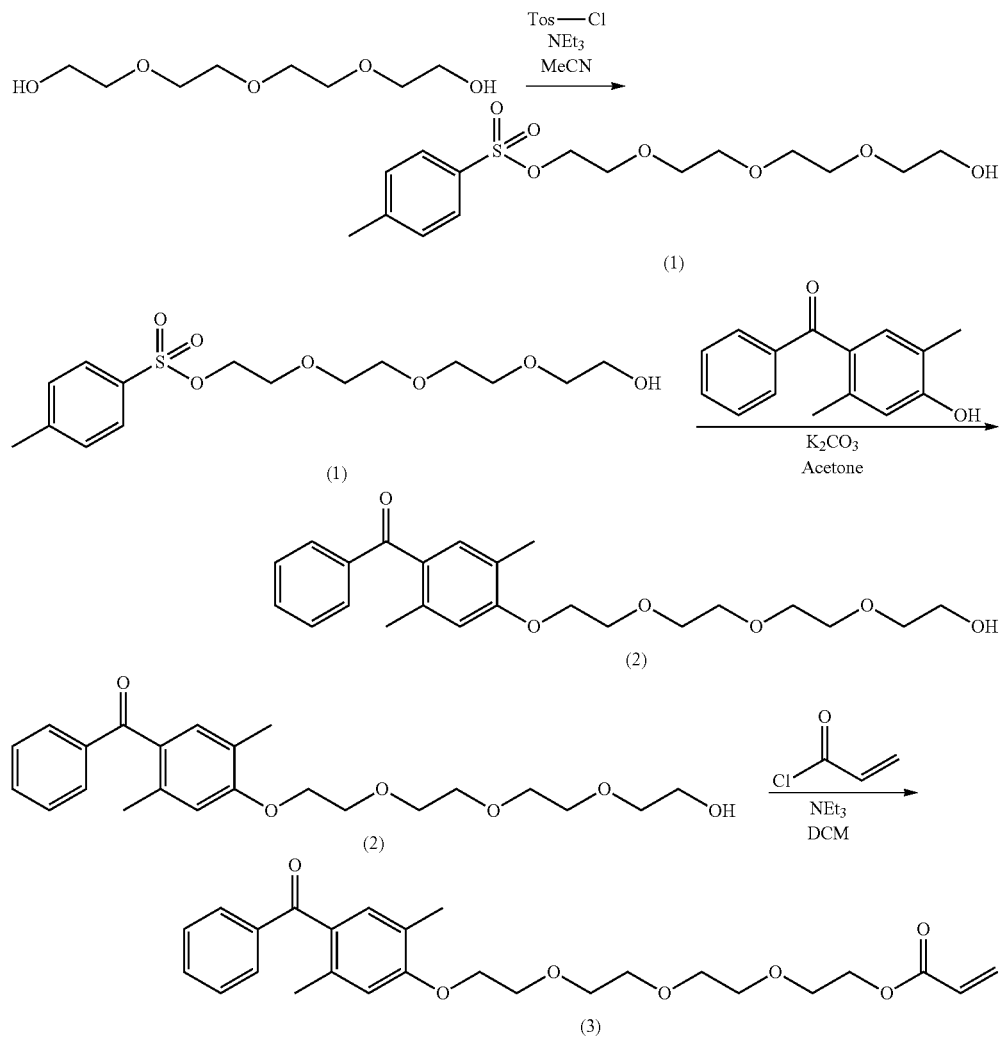

Synthesis of Tos-PEG-OH (1):

Tetraethylene glycol (15 g, 77.2 mmol) is dissolved in 220 ml of acetonitrile. Triethylamine is added dropwise under a nitrogen atmosphere. Then p-toluenesulfonyl chloride (14.718 g, 77.2 mmol), in solution in 75 ml of acetonitrile, is added dropwise at 0° C. After 12 hours of stirring at room temperature filtration is carried out and the solvent is removed under reduced pressure. Purification by flash chromatography (silica gel, chloroform+10% methanol, Rf=0.68) gives a yellow oil (Yield: 31%).

$^1$H-NMR (CDCl$_3$, 250 MHz): δ/ppm: 2.37 (s, 3H, CH$_3$), 2.68 (bs, 1H, OH), 3.50-3.65 (m, 14H, CH$_2$O), 4.09 (t, 2H, CH$_2$O), 7.29 (d, 2H, H$_{ar}$), 7.70 (d, 2H, H$_{ar}$).

Synthesis of PE-PEG-OH (2):

4-Hydroxy-2,5-dimethylphenyl phenylmethanone (photoenol 1, 16.956 g, 74.9 mmol) is dissolved in 140 ml of anhydrous acetone under a nitrogen atmosphere. Then K$_2$CO$_3$ (10.352 g, 74.9 mmol) is added. A solution of (1) (15.358 g, 44.1 mmol) in 40 ml of anhydrous acetone is added dropwise at room temperature. The mixture is heated under reflux at 60° C. for 39 hours. Following cooling to room temperature, filtration is carried out and the solvent is removed under reduced pressure. Purification by flash chromatography (silica gel, Et$_2$O+10% methanol, Rf=0.53) gives a pale yellow oil (yield: 61%).

$^1$H-NMR (CDCl$_3$, 250 MHz): δ/ppm: 2.10 (s, 3H, CH$_3$), 2.29 (s, 3H, CH$_3$), 2.42 (bs, 1H, OH), 3.51-3.71 (m, 12H, CH$_2$O), 3.83 (t, 2H, CH$_2$O), 4.13 (t, 2H, CH$_2$O), 6.65 (s, 1H, H$_{ar}$), 7.08 (s, 1H, H$_{ar}$), 7.33-7.40 (m, 2H, H$_{ar}$), 7.45-7.51 (m, 1H, H$_{ar}$), 7.67-7.71 (m 2H, H$_{ar}$).

Synthesis of PE-PEG Acrylate (3):

Acryloyl chloride (1 ml, 12.4 mmol) is dissolved in 10 ml of anhydrous dichloromethane under a nitrogen atmosphere.

A solution of (2) (2 g, 4.97 mmol) and triethylamine (2.08 ml, 14.9 mmol) in 15 ml of anhydrous dichloromethane is added dropwise at 0° C. Following the addition, the mixture is allowed to warm to room temperature and is stirred for 24 hours. The solution is washed with water (2×25 ml) and salt solution (2×25 ml) and dried over MgSO$_4$. The solvent is removed under reduced pressure. Purification by flash chromatography (silica gel, Et$_2$O+5% methanol, Rf=0.80) gives a pale yellow oil (yield: 72%).

$^1$H-NMR (CDCl$_3$, 250 MHz): δ/ppm: 2.10 (s, 3H, CH$_3$), 2.30 (s, 3H, CH$_3$), 3.61-3.72 (m, 10H, CH$_2$O), 3.84 (t, 2H, CH$_2$O), 4.13 (t, 2H, CH$_2$O), 4.25 (t, 2H, CH$_2$O), 5.76 (dd, 1H, CH), 6.08 (dd, 1H, CH), 6.36 (dd, 1H, CH), 6.64 (s, 1H, H$_{ar}$), 7.08 (s, 1H, H$_{ar}$), 7.35-7.41 (m, 2H, H$_{ar}$), 7.46-7.52 (m, 1H, H$_{ar}$), 7.67-7.71 (m 2H, H$_{ar}$).

Example 2

Synthesis of Bismaleimide Crosslinkers

Synthesis scheme:

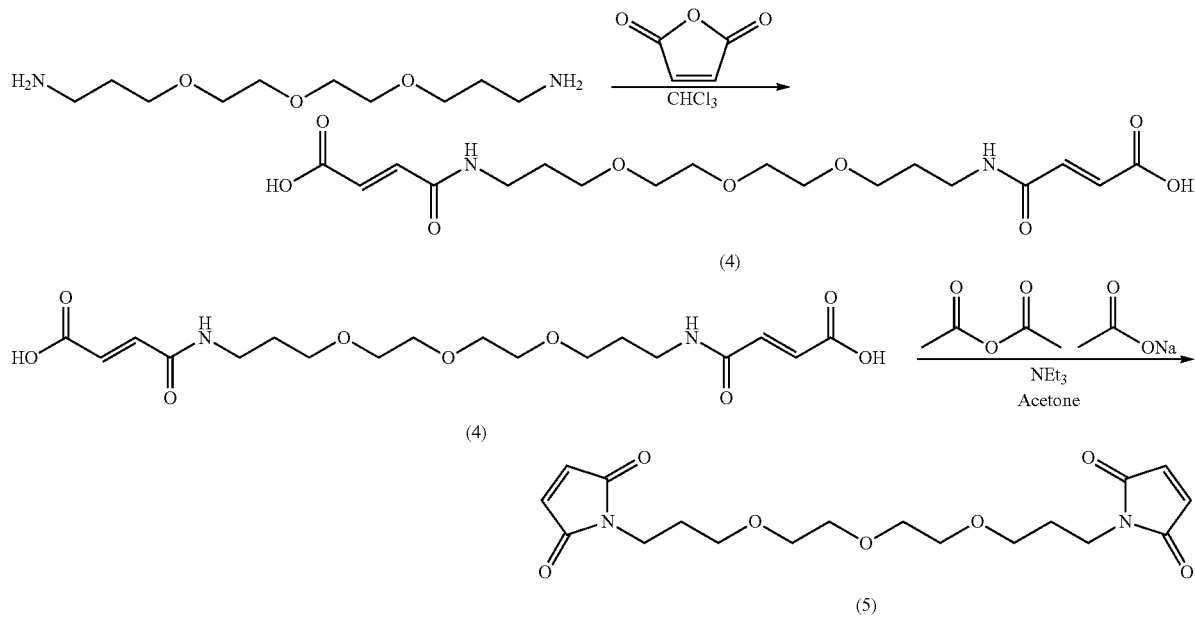

Synthesis of Compound (4):

Maleic anhydride (8.902 g, 90.8 mmol) is dissolved in 50 ml of chloroform. A solution of 4,7,10-trioxa-1,13-tridecanediamine (9.95 ml, 45.4 mmol) in 5 ml of chloroform is added dropwise at 0° C. Following the addition, the mixture is allowed to warm to room temperature and is stirred for 12 hours. Removal of the solvent under reduced pressure gives a yellow oil as a crude product which is used further without other purification.

Synthesis of Compound (5):

Triethylamine (2.988 g, 29.5 mmol), sodium acetate (2.83 g, 34.5 mmol) and acetic anhydride (29.43 g, 288.3 mmol) are added to a solution of (4) (18.906 g, 45.4 mmol) in 80 ml of acetone. The mixture is heated under reflux at 70° C. and after 3 hours is slowly cooled. Following filtration, the solvent is removed under reduced pressure, to form a brown oil. For removal of acetic acid and acetic anhydride, 50 ml of water are added and the mixture is stirred at room temperature for 3 days. Subsequent extraction with dichloromethane, drying over MgSO$_4$ and removal of the solvent under reduced pressure give a brown oil as crude product. Purification by flash chromatography (silica gel, Et$_2$O+2% methanol, Rf=0.44) gives an off-white solid (yield: 52%).

$^1$H-NMR (D$_2$O, 250 MHz): δ/ppm: 1.96 (dd, 4H, CH$_2$), 3.61-3.76 (m, 16H, CH$_2$N and CH$_2$O), 6.95 (s, 4H, CH).

Example 3

Synthesis of Photoenol Monomer 2

Synthesis scheme:

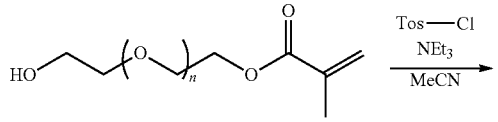

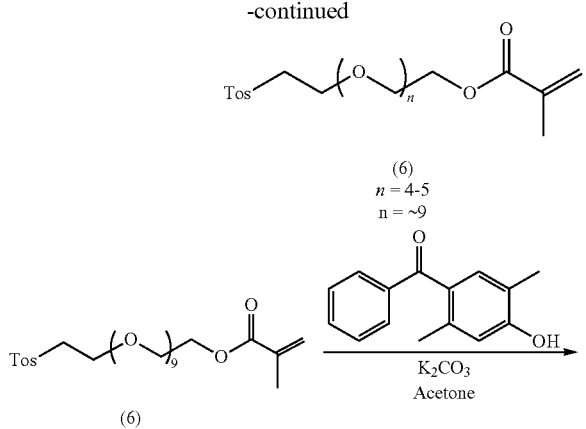

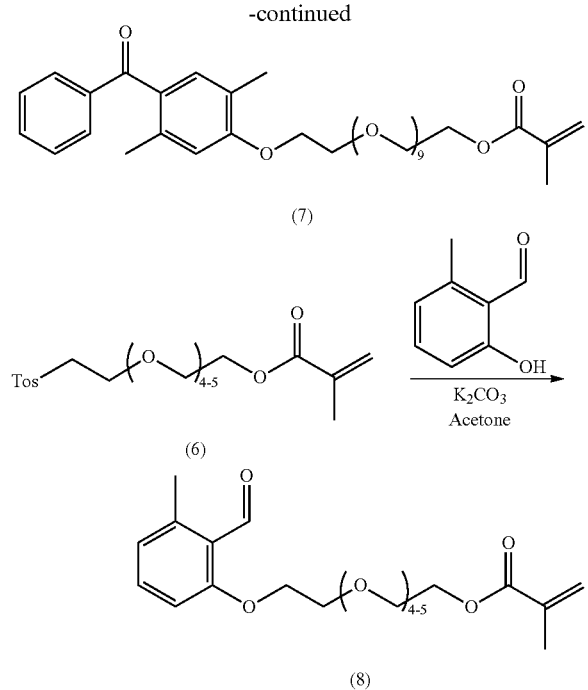

Synthesis of Compound (6):

The synthesis for n=4-5 is described; for n=9, the same preparation process can be employed.

Triethylamine (4.28 ml, 30.7 mmol) is added under a nitrogen atmosphere to a solution of poly(ethylene glycol) methacrylate (Mn=360, 11.05 g, 30.7 mmol) in 100 ml of acetonitrile. p-Toluenesulfonyl chloride (5.852 g, 30.7 mmol) is dissolved in 50 ml of acetonitrile and added dropwise at 0° C. Following the addition, the mixture is allowed to warm to room temperature and is stirred for 12 hours. The solution is filtered and, following addition of hydroquinone (0.3 g), the solvent is removed under reduced pressure at 25° C. The crude product is used further without further purification.

Synthesis of Compound (7):

4-Hydroxy-2,5-dimethylphenyl phenylmethanone (photoenol 1, 0.7976 g, 3.53 mmol) is dissolved in 15 ml of anhydrous acetone. Hydroquinone (0.1 g) and $K_2CO_3$ (0.69 g, 4.99 mmol) are added, Following dropwise addition of a solution of (6) (n=9, 2.0 g, 2.94 mmol) in 25 ml of anhydrous acetone at room temperature, the mixture is heated under reflux at 60° C. for 22 hours. The solvent is removed under reduced pressure, to form a dark-brown oil.

Synthesis of Compound (8):

2-Hydroxy-6-methylbenzaldehyde (photoenol 2, 2.0 g, 14.7 mmol) is dissolved in 40 ml of anhydrous acetone. Hydroquinone (0.1 g) and $K_2CO_3$ (3.385 g, 24.5 mmol) are added, Following dropwise addition of a solution of (6) (n=4-5, 6.273 g, 12.2 mmol) in 30 ml of anhydrous acetone at room temperature, the mixture is heated under reflux at 60° C. for 18 hours. The solvent is removed under reduced pressure, to form a dark-brown oil.

Example 4

Copolymerization of Photoenol Monomer 2 with MMA and nBA

Polymeric nanoparticles are prepared from methyl methacrylate and n-butyl acrylate by emulsion polymerization. Following a conversion of 85%, a third monomer is injected: Photoenol 2 monomer (compound (8), see above). The purity of the monomer as determined by $^1$H-NMR is approximately 70%.

In a 3-neck flask with reflux condenser and thermometer, a mixture of methyl methacrylate (3.93 g) and n-butyl acrylate (5.27 g) is added to an aqueous solution of sodium dodecyl sulfate (0.3564 g in 18.15 ml). The emulsion is stirred at 250 rpm and is freed from oxygen by the passage of nitrogen through the emulsion over the course of 30 minutes. In a small flask, an aqueous solution of sodium persulfate (0.0501 g in 0.5 ml) is freed from oxygen by the passage of nitrogen through the solution over the course of 30 minutes. The emulsion is heated to 60° C., and then the initiator solution is added to initiate the polymerization. After 24 minutes a mixture of photoenol 2 monomer (0.5 g, compound (8), see above), water (2 ml), and sodium persulfate (0.00371 g), through which nitrogen has been passed for 30 minutes, is added to the emulsion. After 3 hours the polymerization is terminated by cooling to room temperature and exposure to oxygen. The dispersion is filtered through a paper filter to remove traces of precipitated polymer.

Example 5

Homopolymerization of Photoenol Monomer 1

Photoenol monomer 1 (0.7581 g, 1.66 mmol; compound (3), see above) is dissolved in 1 ml of 2-butanone. Following addition of 1 ml of stock solution of azoisobutyronitrile in 2-butanone (0.0023 g, 0.00138 mmol, 5 mmol/l), the reaction solution is degassed by 4 freeze-pump-thaw cycles and then introduced into an oil bath at 70° C. The reaction solution is protected from light with an aluminum foil cover. After 26.5 hours, the reaction solution is dissolved in THF and the polymer is isolated by precipitation from cold diethyl ether. The conversion as determined by $^1$H-NMR is 97%.

THF-GPC (PS calibration): $M_n$=19 000 g/mol, $M_w$=39 500 g/mol, PDI=2.07

THF-GPC (PMMA calibration): $M_n$=18 800 g/mol, $M_w$=39 900 g/mol, PDI=2.12

Example 6

ATRP of Photoenol Monomer 1

Methyl 2-bromopropionate (0.006 ml, 0.00548 mmol, 1 eq) and PMDETA (0.0086 ml, 0.00411 mmol, 0.75 eq) are added to a solution of photoenol monomer 1 (0.50 g, 1.095 mmol, 20 eq; compound (3), see above) in 0.595 ml of 2-butanone. The reaction solution is degassed by 3 freeze-pump-thaw cycles. During the last cycle, copper(I) bromide (0.0039 g, 0.00274 mmol, 0.5 eq) is added. The reaction flask is then introduced into an oil bath at 70° C. and protected from light with an aluminum foil cover. After 12 hours, the reaction is terminated by cooling to room temperature and exposure to oxygen. The conversion as determined by $^1$H-NMR is 36%.

THF-GPC (PS calibration): $M_n$=3400 g/mol, $M_w$=3700 g/mol, PDI=1.08

THF-GPC (PMMA calibration): $M_n$=3100 g/mol, $M_w$=3300 g/mol, PDI=1.08

Example 7

Coating, Film Formation

Coating operations with photoenol polymer dispersions, prepared as in example 4 but with the photoenol monomer 1

(example 1, compound (3)) as comonomer (40 wt % methyl methacrylate, 55 wt % n-butyl acrylate, 5 wt % photoenol monomer 1), take place in polystyrene Petri dishes with a diameter of approximately 4 cm. A defined amount of the polymer dispersions is poured into the Petri dish and, protected from ingress of light, is dried in the air at room temperature (at least 1 day). This produces a uniform, transparent film. Layer thickness approximately 0.2 to 0.3 mm.

Example 8

Crosslinking

For crosslinking experiments, the polymer dispersions prior to coating are admixed with a crosslinker that has two terminal N-maleimide groups (example 2). For this purpose the crosslinker is first melted in a small glass vessel by heating with a stream of hot air at approximately 60 to 70° C. A defined amount of photoenol polymer dispersion is then added to this glass vessel, making the amount of crosslinker 1 or 2 wt %, based on the amount of the emulsion polymer, and stirring is carried out for around 10 minutes. Thereafter the polymer dispersion is poured into polystyrene Petri dishes and is dried at room temperature, protected from ingress of light, in the air (at least 1 day). This produces uniform, transparent films. The dried films are irradiated in a photoreactor for 5 or 10 hours, by rotation of the vertically mounted Petri dishes around a UV lamp. Following irradiation, the films exhibit increased strength. Layer thickness approximately 0.2 to 0.3 mm.

Example 9

Storage Modulus Measurements

The storage modulus G' was measured on films produced in the same way as for examples 7 and 8, with a thickness of approximately 0.8 to 1.0 mm.

Sample 9A: comprising 2 wt % maleimide crosslinker (example 2); 10 h irradiation Sample 9B: without maleimide crosslinker; 10 h irradiation The measurements are made by means of dynamic-mechanical thermo-analysis (DMTA). Measuring instrument: deformation-controlled modular rheometer system Ares; Parallel-Plate geometry with 8 mm diameter.

Dynamic shear modulus, measurement frequency 1 Hz, heating rate 2° C./min, measuring temperature −20° C. to +200° C.

The results (averages from 2-3 measurements) are listed in table 1.

TABLE 1

| | Storage modulus G' | | | |
|---|---|---|---|---|
| Sample | G' [Pa] at 0° C. | G' [Pa] at 80° C. | G' [Pa] at 120° C. | G' [Pa] at 180° C. |
| 9A | $1.6 * 10^8$ | $2.3 * 10^5$ | $1.8 * 10^5$ | $1.7 * 10^5$ |
| 9B | $1.2 * 10^8$ | $1.4 * 10^5$ | $1.1 * 10^5$ | $0.96 * 10^5$ |

Sample 9A, particularly at relatively high temperatures, has a significantly greater storage modulus G' than the uncrosslinked sample 9B. This can be interpreted as a clear indication of crosslinking via the photoenol mechanism.

The invention claimed is:

1. A photoreactive polymer obtained by a process comprising: radically polymerizing at least one photoreactive monomer,
    wherein the photoreactive monomer comprises:
    (i) a radically polymerizable C—C double bond,
    (ii) a hydrophilic group selected from the group consisting of an ethylene glycol group and a polyethylene glycol group comprising at least 2 ethylene glycol units, and
    (iii) a photoenolizable carbonyl group as a photoreactive group.

2. The polymer according to claim 1, wherein the radically polymerizable C—C double bond is part of an acrylate or a methacrylate group.

3. The polymer according to claim 1, wherein the hydrophilic group is a group comprising 2 to 30 ethylene glycol groups.

4. The polymer according to claim 1, wherein the photoreactive group is a photoenolizable alpha-aryl-carbonyl group.

5. The polymer according to claim 1, wherein the photoreactive group derives from a structural unit of formula

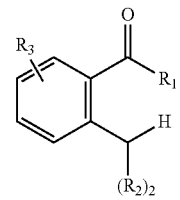

wherein:
    R1 is hydrogen or an organic radical,
    R2 is independently hydrogen or an organic radical, and
    R3 represents substituents, which are identical to or different from one another and optionally joined to one another via one or more ring structures.

6. The polymer according to claim 1, wherein the photoreactive monomer is selected from the group consisting of a compound of a structure

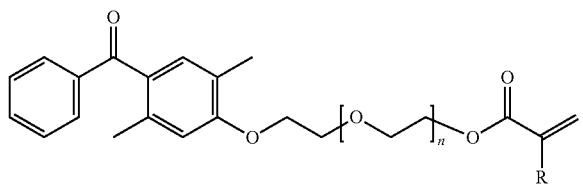

wherein n is a number of from 0 to 29, and R is hydrogen or methyl,
and a compound of a structure

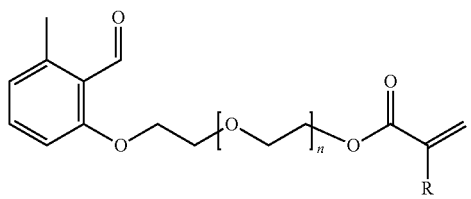

wherein n is a number of from 0 to 19, and R is hydrogen or methyl.

7. The polymer according to claim 1, wherein
the polymer is a homopolymer or a copolymer, and
with the proviso that the polymer is a copolymer, an amount of the photoreactive monomer is not less than 0.1 wt %, based on a total amount of all monomers.

8. The polymer according to claim 1, wherein
the polymer is a copolymer, and
the photoreactive monomer is copolymerized with at least one further monomer selected from the group consisting of a C1 to C20 alkyl(meth)acrylate, a C1 to C20 hydroxyalkyl(meth)acrylate, a vinyl ester of a carboxylic acid comprising up to 20 C atoms, a vinylaromatic comprising up to 20 C atoms, an ethylenically unsaturated nitrile, a vinyl halide, a vinyl ether of an alcohol comprising 1 to 10 C atoms, an aliphatic hydrocarbon comprising 2 to 8 C atoms and one or two double bonds, and an acid monomer.

9. The polymer according to claim 8, wherein an amount of the at least one further monomer is of from 60 to 99.9 wt %, and
an amount of the photoreactive monomer is of from 0.1 to 40 wt %.

10. An aqueous composition comprising at least one polymer according to claim 1 in water, in either a dissolved or a dispersed form.

11. The composition according to claim 10, further comprising: a compound comprising an electron-deficient double bond.

12. The composition according to claim 11, wherein the compound comprises at least two electron-deficient double bonds.

13. The composition according to claim 11, wherein the compound comprises a structural unit derived from maleic acid, maleic anhydride, fumaric acid, a maleimide, a maleic monoester or diester, a fumaric monoester or diester, an acrylic ester, an acrylamide, or an itaconic ester.

14. A crosslinked polymer obtained by a process comprising: photoinducedly crosslinking the polymer according to claim 1 with a compound comprising at least two electron-deficient double bonds.

15. A process for preparing a crosslinked polymer, comprising:
obtaining at least one polymer according to claim 1 and at least one compound comprising at least two electron-deficient double bonds, and
carrying out a photochemical crosslinking reaction, thereby obtaining the crosslinked polymer.

16. The process according to claim 15, wherein the at least one polymer is prepared by emulsion polymerization.

17. A method of preparing an article, the method comprising: introducing the polymer according to claim 1 to an article in need thereof,
wherein the article is an adhesive, a coating, a paint, a varnish, an ink, a thickener, a tackifier resin, a protective colloid, or a dispersant.

18. The polymer according to claim 1, wherein the photoreactive monomer is selected from the group consisting of
a compound of a structure

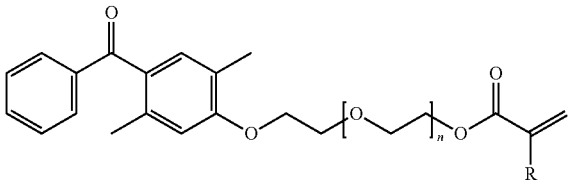

wherein n is a number of from 4 to 29, and R is hydrogen or methyl,
and a compound of a structure

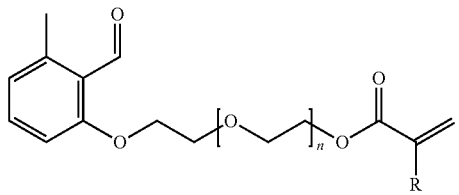

wherein n is a number of from 0 to 19, and R is hydrogen or methyl.

19. The polymer according to claim 1, wherein the photoreactive monomer is selected from the group consisting of
a compound of a structure

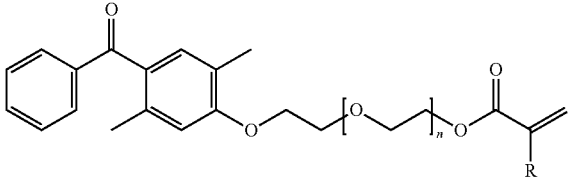

wherein n is a number of from 0 to 29, and R is methyl,
and a compound of a structure

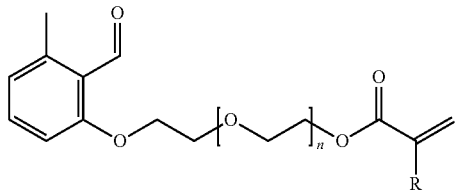

wherein n is a number of from 0 to 19, and R is hydrogen or methyl.

20. The polymer according to claim 1, wherein the photoreactive monomer is a compound of a structure

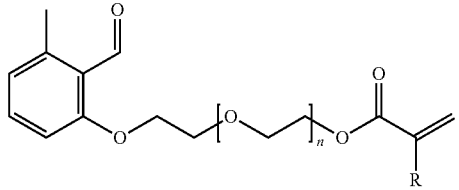

wherein n is a number of from 0 to 19, and R is hydrogen or methyl.

* * * * *